(12) United States Patent
Kim

(10) Patent No.: US 7,701,526 B2
(45) Date of Patent: Apr. 20, 2010

(54) LIQUID CRYSTAL DISPLAY DEVICE AND METHOD OF FABRICATING THE SAME

(75) Inventor: Ju-Pyoung Kim, Wonju-si (KR)

(73) Assignee: LG Display Co., Ltd., Seoul (KR)

( * ) Notice: Subject to any disclaimer, the term of this patent is extended or adjusted under 35 U.S.C. 154(b) by 368 days.

(21) Appl. No.: 11/438,320

(22) Filed: May 23, 2006

(65) Prior Publication Data

US 2006/0279207 A1 Dec. 14, 2006

(30) Foreign Application Priority Data

Jun. 10, 2005 (KR) ............... 10-2005-0049567

(51) Int. Cl.
*G02F 1/1333* (2006.01)

(52) U.S. Cl. .............. 349/54; 349/139; 349/158; 349/192; 349/106; 349/110

(58) Field of Classification Search ............ 349/54, 349/55, 192, 149–152, 122, 138, 158, 153, 349/139, 187, 106, 110, 40, 43; 313/506; 345/93
See application file for complete search history.

(56) References Cited

U.S. PATENT DOCUMENTS

| | | | | |
|---|---|---|---|---|
| 4,670,744 A | * | 6/1987 | Buzak | 345/6 |
| 5,220,443 A | * | 6/1993 | Noguchi | 349/40 |
| 5,831,709 A | * | 11/1998 | Song | 349/149 |
| 6,771,327 B2 | * | 8/2004 | Sekiguchi | 349/12 |
| 2003/0067580 A1 | * | 4/2003 | Song et al. | 349/187 |
| 2004/0135496 A1 | * | 7/2004 | Park et al. | 313/504 |
| 2004/0257504 A1 | * | 12/2004 | Kang et al. | 349/122 |
| 2005/0057713 A1 | * | 3/2005 | Mafune et al. | 349/114 |

* cited by examiner

*Primary Examiner*—Thoi V Duong
(74) *Attorney, Agent, or Firm*—McKenna Long & Aldridge LLP

(57) ABSTRACT

A liquid crystal display device comprises: a first substrate including a first display area having a first side, a second side adjacent to the first side and third and fourth sides, and a first non-display area at the first and second sides of the first display area; a second substrate facing the first substrate and including a second display area corresponding to the first display area and having the first to the fourth sides, and a second non-display area at one of the third and the fourth sides of the second display area; a thin film transistor over an inner surface of the first substrate; a pixel electrode connected to the thin film transistor; a common electrode over an inner surface of the second substrate, the common electrode disposed in the second display area and the second non-display area; and a liquid crystal layer between the pixel electrode and the common electrode.

17 Claims, 8 Drawing Sheets

LIQUID CRYSTAL DISPLAY DEVICE AND METHOD OF FABRICATING THE SAME

The present invention claims the benefit of Korean Patent Application No. 2005-0049567 filed in Korea on Jun. 10, 2005, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device and a method of fabricating the same.

2. Discussion of the Related Art

LCD devices are favored as display devices because they are light weight, have a thin profile, and do not consume much power. In general, an LCD device is a non-emissive display device that displays images using a refractive index difference incorporating optically anisotropic properties of liquid crystal material that is interposed between an array (TFT) substrate and a color filter (CF) substrate. Among the various types of LCD devices commonly used, active matrix LCD (AM-LCD) devices have been favored because of their high resolution and superiority in displaying moving images. The AM-LCD device includes a thin film transistor (TFT) per each pixel region as a switching device, a first electrode for ON/OFF, and a second electrode called a common electrode.

FIG. 1 is a schematic plan view showing a related art LCD device, and FIG. 2 is a schematic cross-sectional view showing an LCD device according to the related art.

In FIGS. 1 and 2, an LCD device 1 includes a first substrate 11, a second substrate 61 facing the first substrate 11, and a liquid crystal layer 90 between the first and the second substrates 11 and 61 respectively. Specifically, the first substrate 11 includes a first display area "DA1" having a first side "S1" and a second side "S2" adjacent to the first side "S1," and third and fourth sides "S3" and "S4," and a first non-display area "NDA1" at the first and the second sides "S1 and S2."

The second substrate 61 includes a second display area "DA2" corresponding to the first display area "DA1" and having the first to fourth sides "S1" to "S4."

A seal pattern 85 is substantially formed to surround the first to fourth sides "S1" to "S4" of the first and the second substrates 11 and 61.

A gate electrode 15, a gate insulating layer 20, a semiconductor layer 23 and a source electrode 33 and a drain electrode 35 are sequentially layered on an inner surface of the first substrate 11 and constitute a thin film transistor "Tr."

A gate line 13 is connected to the gate electrode 15. A data line 30 is connected to the source electrode 33 and crosses the gate line 13 to define a pixel region "P."

A passivation layer 40 is formed on the thin film transistor "Tr" and has a drain contact hole 43 that exposes a portion of the drain electrode 35. A pixel electrode 50 is formed on the passivation layer 40 in the pixel region "P" and is connected to the drain electrode 35 via the drain contact hole 43.

A black matrix 63 is formed on an inner surface of the second substrate 61 and includes a first black matrix pattern 63a in a first non-pixel region (not shown) at a boundary between the pixel regions P and a second black matrix pattern 63b in a second non-pixel region (not shown) in a periphery of the second display area "DA2." A color filter layer 66 is formed on the black matrix 63 and includes red, green and blue sub-color filters 66a, 66b and 66c. The first black matrix pattern 63a is substantially disposed between the red, green and blue sub-color filters 66a, 66b and 66c.

A common electrode 70 is substantially formed on the black matrix 63 and the color filter layer 66. The common electrode 70 and the pixel electrode 50 may include a transparent conductive material.

Furthermore, a gate pad 52 extends from an end portion of the gate line 13 and a data pad 54 extends from an end portion of the data line 30 and are formed in the first non-display area "NDA1" corresponding to the first and the second sides "S1" and "S2," respectively.

As explained above, the first substrate 11 has the first non-display area "NDA1" displaced from the second display area "DA2" of the second substrate 61. In other words, whole areas of the second substrate 61 correspond to the first display area "DA1" of the first substrate 11. Therefore the second substrate 61 does not have an extended region exposed from the first substrate 11.

A common voltage is provided to the common electrode 70 through a common line (not shown) formed in the first non-display area "NDA1" corresponding to the first side "S1" or the second side "S2" through silver (Ag) dots 83 disposed at four corners between the first substrate 11 and the second substrate 61 to connect the common electrode 70, respectively, and the common line (not shown) formed in the first display area "DA1" and the second display area "DA2."

Accordingly, the LCD device 1 according to the related art has the Ag dot 83 substantially on an inner portion of the seal pattern 85, therefore, it is practically impossible to measure whether or not the common voltage is normally applied to the common electrode 70.

Further, upon forming the Ag dot 83, the first substrate 11 and the second substrate 61 may not be electrically connected to each other due to an insufficient amount of Ag dots 83.

Accordingly, when Ag dot 83 defects are increased, image quality of the LCD device 1 is reduced because of increased resistance of the common electrode 70.

In other words, it is impossible to measure whether or not the common voltage is normally applied to the common electrode 70 through the Ag dot 83. Consequently, defects arising from the Ag dot 83 cannot be measured through the related art LCD structure.

SUMMARY OF THE INVENTION

Accordingly, the present invention is directed to a liquid crystal display device and method of fabricating the same that substantially obviates one or more of the problems due to limitations and disadvantages of the related art.

An advantage of the present invention is to provide a liquid crystal display device and a method of fabricating the same that can substantially measure the common voltage applied to the common electrode through at least a Ag dot in order to easily analyze the resistance of the common electrode and to easily find any existing Ag dot defect.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises: a first substrate including a first display area having a first side, a second side substantially adjacent to the first side and third and fourth sides, and a first non-display area at the first and second sides of the first display area; a second substrate facing the first substrate and including a second display area corresponding to the first display area and having the first to the fourth sides, and a second non-display area at one of the third and the fourth sides of the second display area; a thin film transistor over an inner surface of the first substrate; a pixel electrode connected to the thin film transistor; a common electrode over an inner surface of the second substrate, the common electrode disposed in the second display area and the second non-display area; and a liquid crystal layer between the pixel electrode and the common electrode.

In another aspect, a method of fabricating a liquid crystal display device includes: forming a thin film transistor over a first substrate including a first display area having a first side, a second side substantially adjacent to the first side and third and fourth sides, and a first non-display area at the first and second sides of the first display area; forming a pixel electrode connected to the thin film transistor; forming a common electrode over a second substrate including a second display area having the first to the fourth sides, and a second non-display area at one of the third and the fourth sides of the second display area, the common electrode disposed in the second display area and the second non-display area; forming a seal pattern at a region surrounding one of the first display area and the second display area; attaching the first substrate and the second substrate so as to face the pixel electrode and the common electrode and so that the second display area substantially corresponds to the first display area; and interposing a liquid crystal layer between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DISCRIPTION OF THE ILLUSTRATED EMBODIMENTS

Reference will now be made in detail to an embodiment of the present invention, examples of which are illustrated in the accompanying drawings.

Figure 1:
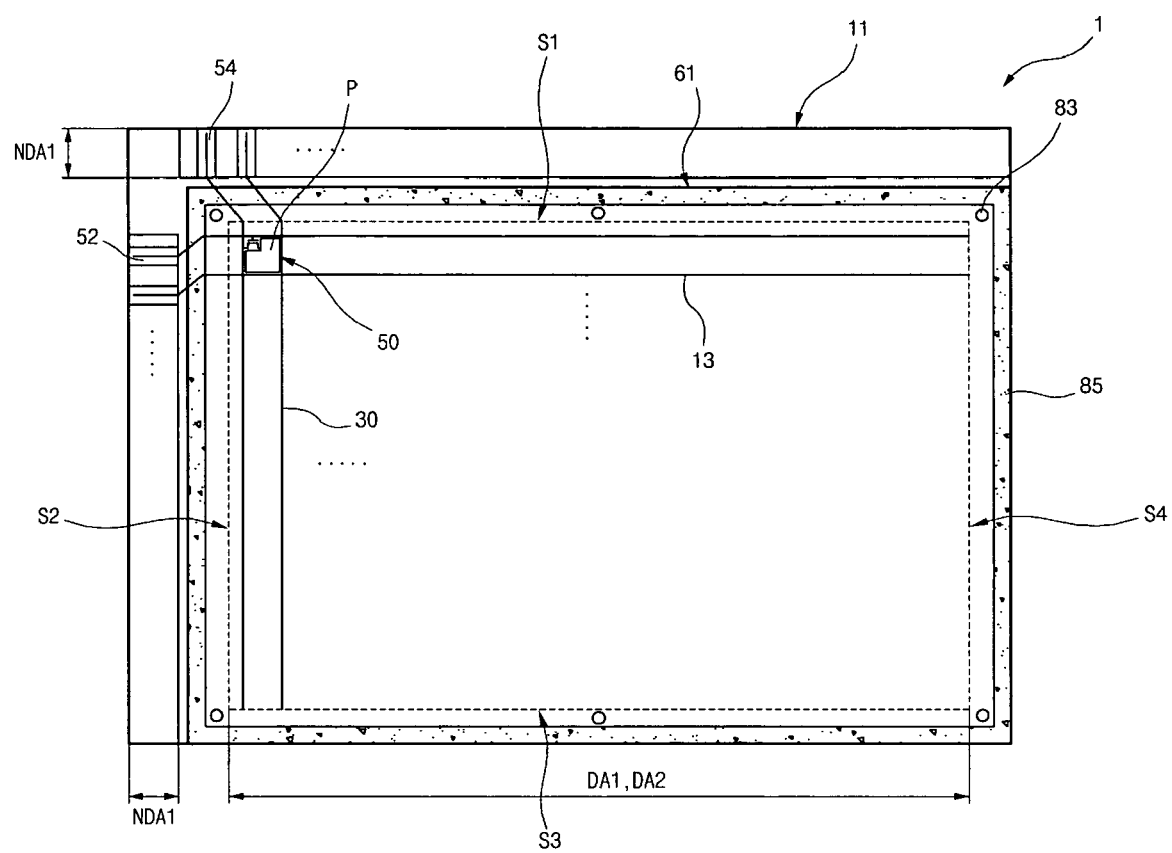
FIG. 1 is a schematic plan view showing an LCD device of the related art.
Figure 2:
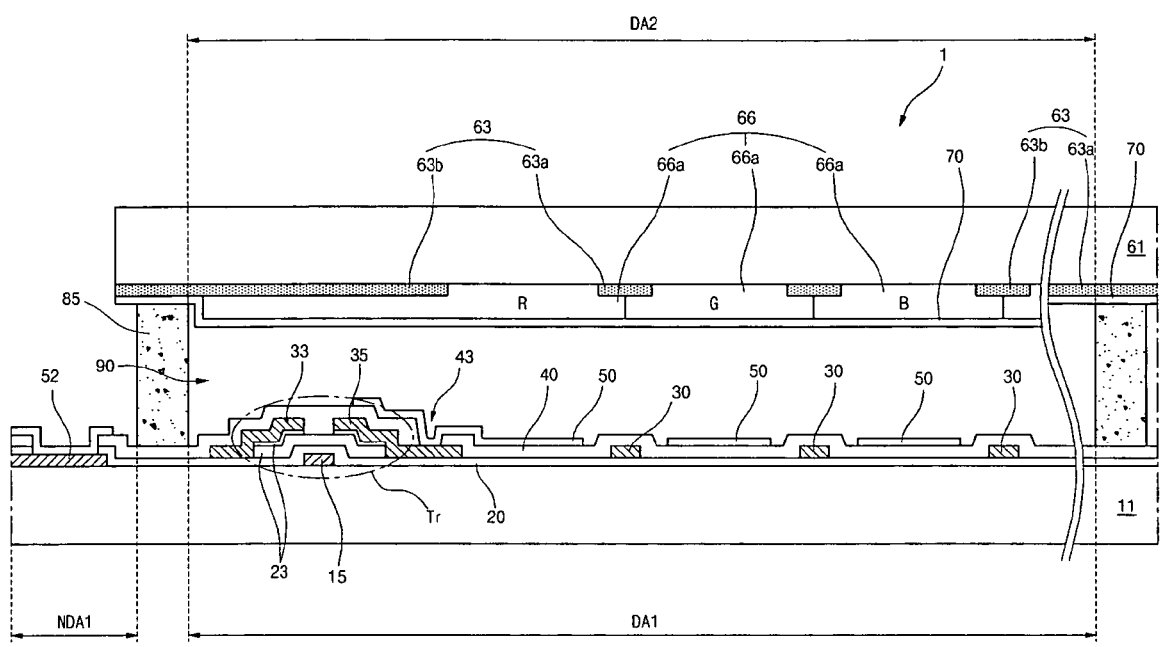
FIG. 2 is a schematic cross-sectional view showing an LCD device according to the related art.
Figure 3:
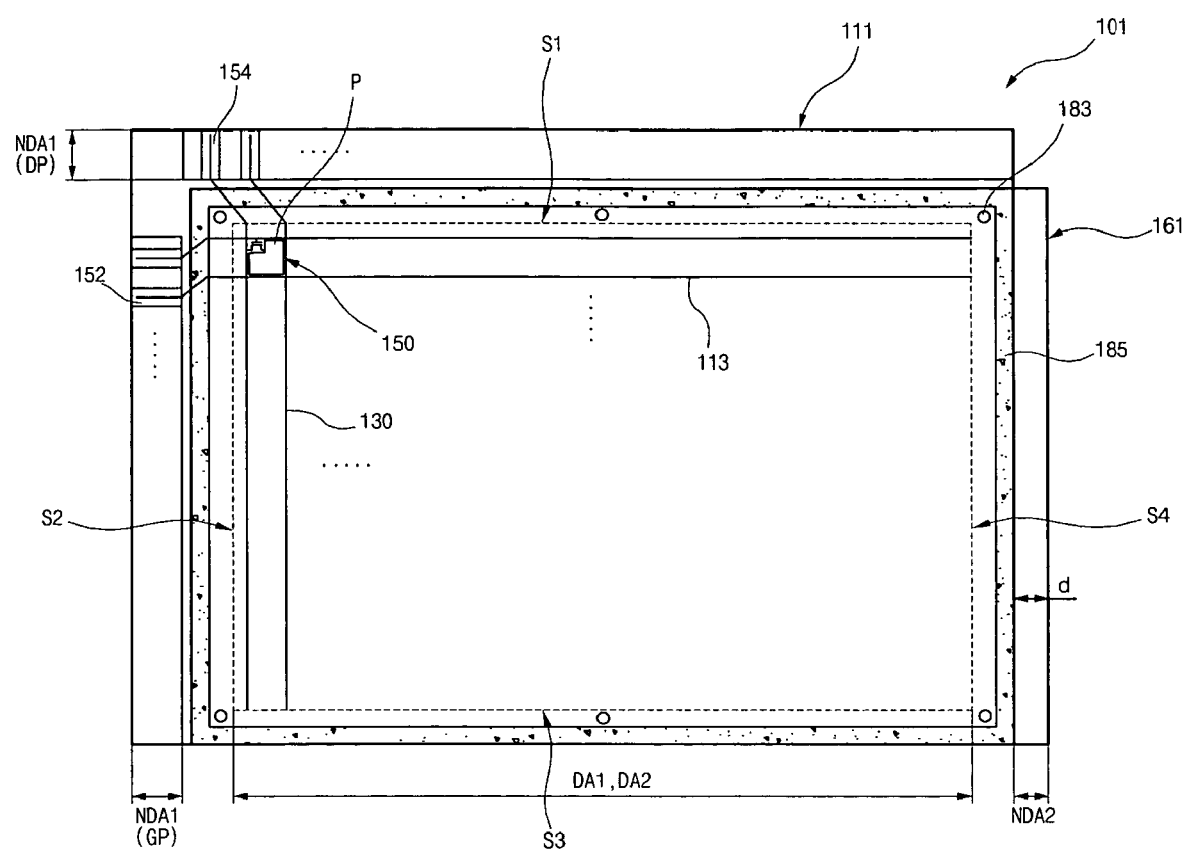
FIG. 3 is a schematic plan view showing an LCD device according to an embodiment of the present invention.
Figure 4:
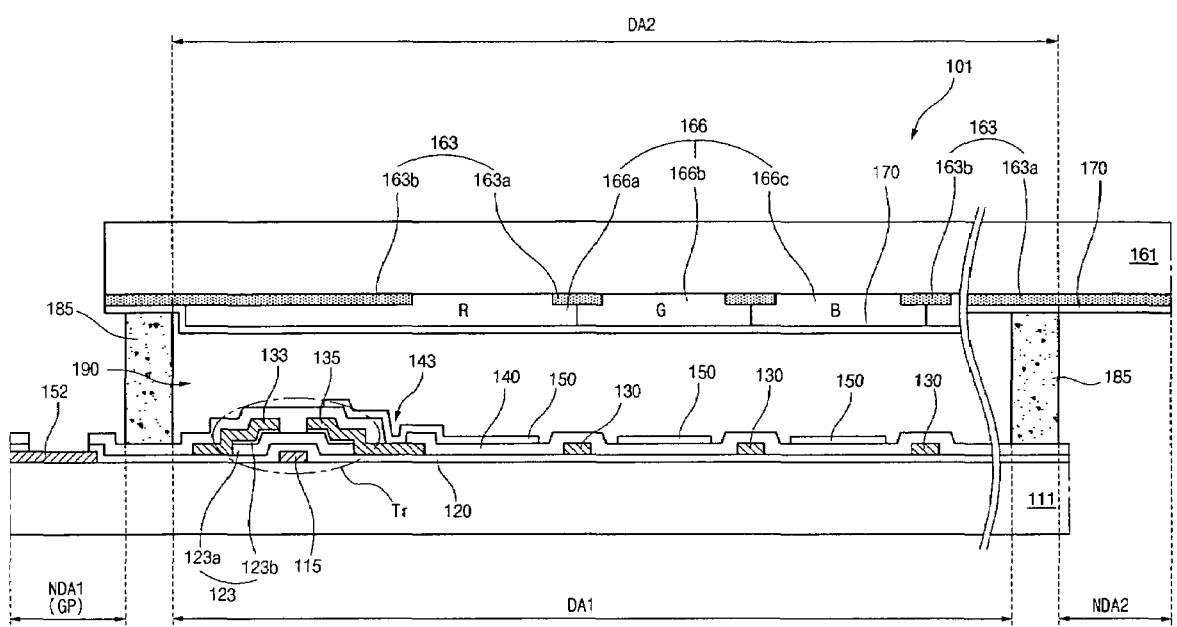
FIG. 4 is a schematic cross-sectional view showing an LCD device according to an embodiment of the present invention.

FIG. 3 is a schematic plan view showing an LCD device and FIG. 4 is a schematic cross-sectional view showing an LCD device according to an embodiment of the present invention.

In FIGS. 3 and 4, an LCD device 101 includes: a first substrate 111, a second substrate 161 facing the first substrate 111, and a liquid crystal layer 190 between the first and the second substrates 111 and 161. Specifically, the first substrate 111 includes a first display area "DA1" having a first side "S1" and a second side "S2" substantially adjacent to the first side "S1," and third and fourth sides "S3" and "S4," and a first non-display area "NDA1" at the first and the second sides "S1 and S2." For example, the first non-display area "NDA1" includes a data pad region "DP" at the first side "S1" and a gate pad region "GP" at the second side "S2."

The second substrate 161 includes a second display area "DA2" substantially corresponding to the first display area "DA1" and having the first to fourth sides "S1" to "S4," and a second non-display area "NDA2" at one of the third and the fourth sides "S3 and S4." For example, as shown in FIG. 3, the second non-display area "NDA2" is disposed at the fourth side "S4."

A seal pattern 185 is substantially formed to surround the first to fourth sides, "S1" to "S4" of the first and the second substrates 111 and 161 in order to prevent leakage of the liquid crystal layer 190 and to maintain a cell gap (not shown) between the first and the second substrates 111 and 161.

A gate electrode 115 is formed on an inner surface of the first substrate 111, a gate insulating layer 120 is formed on an entire surface of the first substrate 111 including the gate electrode 115, a semiconductor layer 123 is formed on the gate insulating layer 120 and includes an active layer 123a and an ohmic contact layer 123b on the active layer 123a, and a source electrode 133 and a drain electrode 135 are spaced apart from each other. Here, the gate electrode 115, the semiconductor layer 123, and the source and drain electrodes 133 and 135 constitute a thin film transistor "Tr."

A gate line 113 is formed along a first direction and is connected to the gate electrode 115. A data line 130 is formed along a second direction and is connected to the source electrode 133 to define a pixel region "P."

A passivation layer 140 is formed on an entire surface of the first substrate 111 including the thin film transistor "Tr" and has a drain contact hole 143 that exposes a portion of the drain electrode 135. A pixel electrode 150 is formed on the passivation layer 140 in the pixel region "P" and is connected to the drain electrode 135 via the drain contact hole 143. As show in FIG. 4, each of the pixel electrodes 150 is disposed in each of the pixel regions P between the data lines.

A black matrix 163 is formed on an inner surface of the second substrate 161 and includes a first black matrix pattern 163a in a first non-pixel region (not shown) at a boundary between the pixel regions "P" and a second black matrix pattern 163b in a second non-pixel region (not shown) surrounding an outermost region of the second display area "DA2" and in the second non-display area "NDA2." A color filter layer 166 is formed on the black matrix 163 and may include red, green and blue sub-color filters 166a, 166b and 166c. The first black matrix pattern 163a is substantially disposed between the red, green and blue sub-color filters 166a, 166b and 166c (not completely shown).

A common electrode 170 is formed on an entire surface of the second substrate 161 including the black matrix 163 and the color filter layer 166. Here, it is noted that the common electrode 170 is extended to the second non-display area "NDA2." Substantially, the second black matrix pattern 163b and the common electrode 170 are sequentially layered between the second substrate 161 and the seal pattern 185. The common electrode 170 and the pixel electrode 150 may include a transparent conductive material such as indium tin oxide (ITO) or indium zinc oxide (IZO).

Furthermore, a gate pad 152 extended from an end portion of the gate line 113 and a data pad 154 extended from an end portion of the data line 130 are formed in the first non-display area "NDA1" substantially corresponding to the first and the second sides "S1" and "S2," respectively, in order to be connected to an external circuit, such as a printed circuit board (PCB) having a driving circuit (not shown).

Further, a common line (not shown) is formed in the first non-display area "NDA1" and a silver (Ag) dot 183 is formed for connecting the common line and the common electrode 170 in at least one of edges of the first and second display areas "DA1" and "DA2" and of the first and second non-display areas "NDA1" and "NDA2." For example, as shown in FIG. 3, six Ag dots 183 are substantially formed at first to fourth corners and two central portions substantially between the first and the second corners and substantially between the third and the fourth corners.

For example, a distance "d" between the second display area "DA2" and the second non-display area "NDA2" substantially includes a range within about 0.5 mm to about 2.0 mm. It is noted that the second non-display area "NDA2" does not need to be overlapped with the first non-display area "NDA1" and may be extended from the first display area "DA1" and the first non-display area "NDA1" even if the first substrate 111 and the second substrate 161 are attached.

A common voltage of the common electrode 170 in the second non-display area (not shown) may be measured using a voltmeter, for example, making it possible to confirm whether the Ag dot 183 is defective.

Because the common electrode 170 may be made of a transparent conductive material such as indium tin oxide (ITO) or indium zinc oxide (IZO) which resist corrosion, the common electrode 170 may be exposed to potentially damaging atmospheres for a long time.

Figure 5:
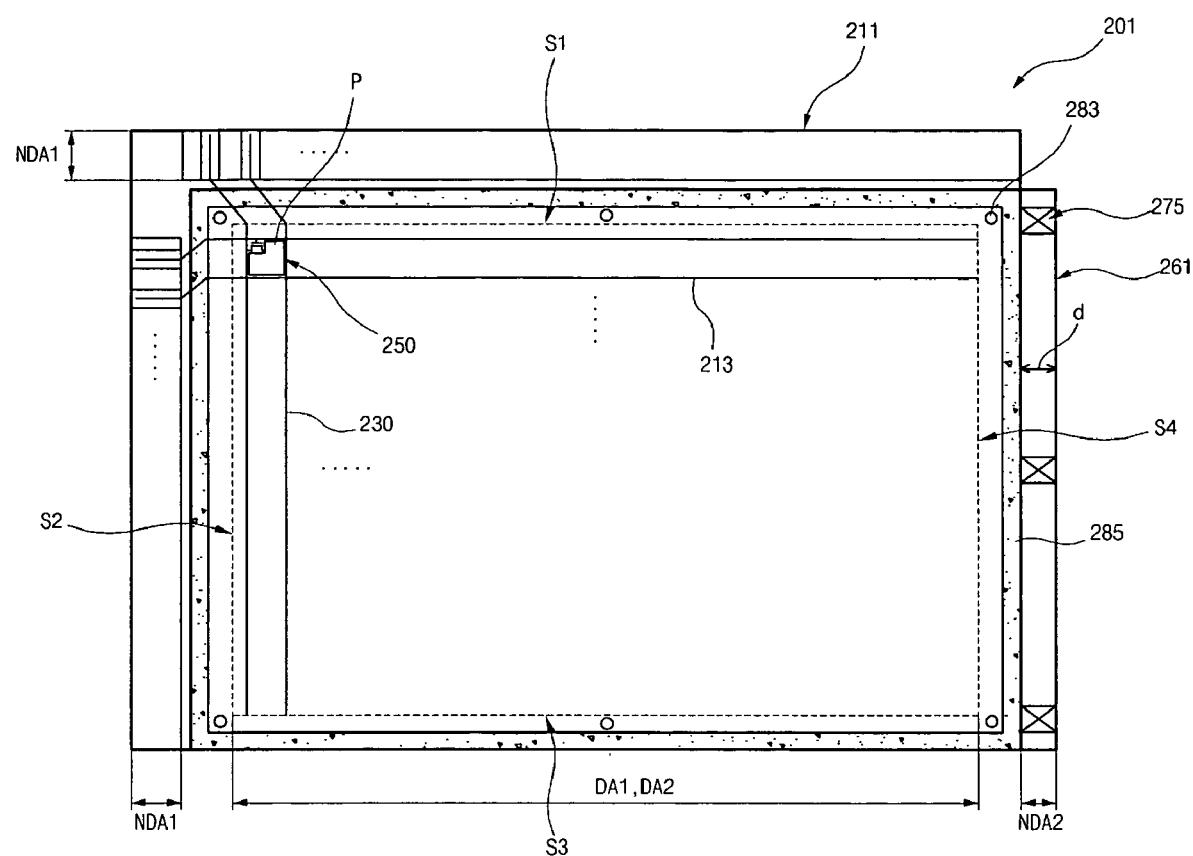
FIG. 5 is a schematic plan view showing an LCD device according to an embodiment of the present invention.
Figure 6:
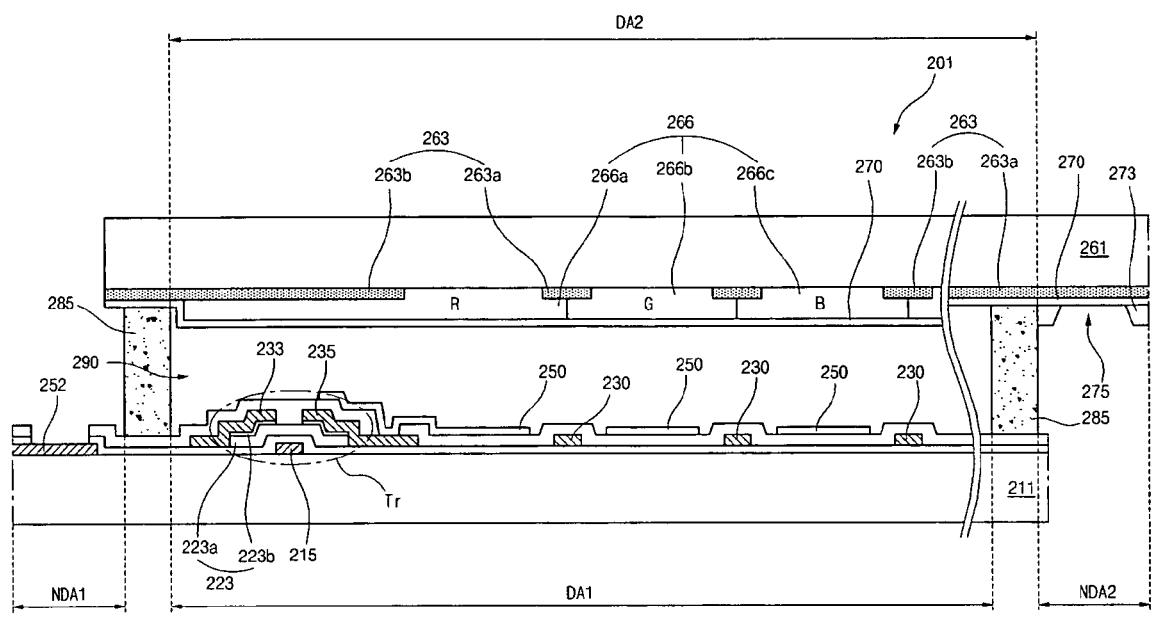
FIG. 6 is a schematic cross-sectional view showing an LCD device according to an embodiment of the present invention.

FIG. 5 is a schematic plan view showing an LCD device according to an embodiment of the present invention and FIG. 6 is a schematic cross-sectional view showing an LCD device according to an embodiment of the present invention.

In FIGS. 5 and 6, an LCD device 201 has a first substrate 211, a second substrate 261 facing the first substrate 211 and a liquid crystal layer 290 between the first and second substrates 211 and 261. Here, the first substrate 211 includes a first display area "DA1" having a first side "S1," a second side "S2" adjacent to the first side "S1" and third and fourth sides "S3" and "S4," and a first non-display area "NDA1" substantially at the first and second sides S1 and S2. The second substrate 261 includes a second display area "DA2" substantially corresponding to the first display area "DA1" and having the first to fourth sides "S1" to "S4," and a second non-display area "NDA2" at one of the third and the fourth sides "S3" and "S4."

A thin film transistor "Tr," which has a gate electrode 215, a semiconductor layer 223, source and drain electrodes 233 and 235, and a pixel electrode 250 connected to a thin film transistor "Tr" are formed on an inner surface of the first substrate 211.

A gate line 213 and a data line 230 crossing the gate line 213 are formed on the first substrate 211 to define a pixel region "P."

A black matrix 263, a color filter layer 266 and a common electrode 270 are sequentially layered on an inner side of the second substrate 261. The black matrix 263 may include a first black matrix pattern 263*a* in a non-pixel region (not shown) at a boundary between the pixel regions P, and a second black matrix pattern 263*b* in a periphery of the second display area "DA2" and in the second non-display area "NDA2." Here, the color filter layer 266 may include red, green and blue sub-color filters 266*a*, 266*b* and 266*c* in the second display area "DA2."

Further, a seal pattern 285 is formed at a region surrounding the first display area "DA1" and the second display area "DA2" between the first substrate 211 and the second substrate 261.

The second black matrix pattern 263*b* and the common electrode 270 are sequentially layered on the second substrate 261 in the second non-display area "NDA2." In addition, an overcoat layer 273 is substantially formed on the common electrode 270 and has a contact hole 275 that exposes a portion of the common electrode 270.

An Ag dot 283 is substantially formed in an edge between the first display area "DA1" and the second display area "DA2" substantially within the seal pattern 285. For example, as shown in FIG. 5, six Ag dots 283 are arranged approximately near the first to fourth corners between the first and the second display areas "DA1" and "DA2" and a first central portion between the first and second corners and a second central portion between the third corners and the fourth corners.

In this embodiment, the overcoat layer 273 having the contact hole 275 is disposed at a region for measuring a common voltage in the second non-display area "NDA2."

The contact hole 275 may be of size so that the contact hole 275 may be contacted with a probe (not shown) of a voltmeter or other instrument. For example, the contact hole 275 may be square shaped corresponding to a distance "d" between the second display area "DA2" and the second non-display area "NDA2."

According to the LCD device 201, since the overcoat layer 273 having the contact hole 275 is formed in the second non-display area "NDA2" and is covered by the common electrode 270, the common electrode 270 is more resistant to corrosion.

FIGS. 7A to 7E are schematic cross-sectional views showing a color filter substrate for an LCD device according to an embodiment of the present invention.

Figure 7A:
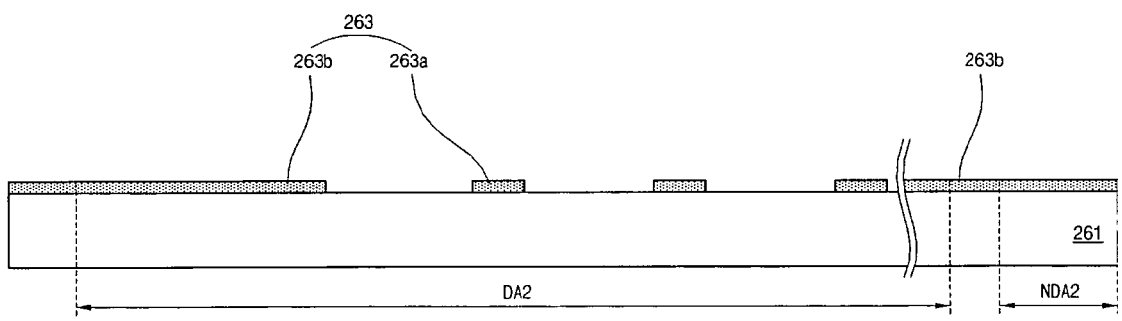
FIGS. 7A to 7E are schematic cross-sectional views showing a color filter substrate for an LCD device according to an embodiment of the present invention.

In FIG. 7A, a black matrix 263 is formed on a second substrate 261 having a second display area "DA2" and a second non-display area "NDA2." The black matrix 236 includes a first black matrix pattern 263*a* in a non-pixel region between pixel regions (not shown), and a second black matrix pattern 263*b* in a periphery of the second display area "DA2" and in the second non-display area "NDA2." For example, the black matrix 263 may include black resin or chromium (Cr).

Although not shown, the second black matrix pattern 263*b* may be extended from the first black matrix pattern 263*a* as one continuous body.

Figure 7B:
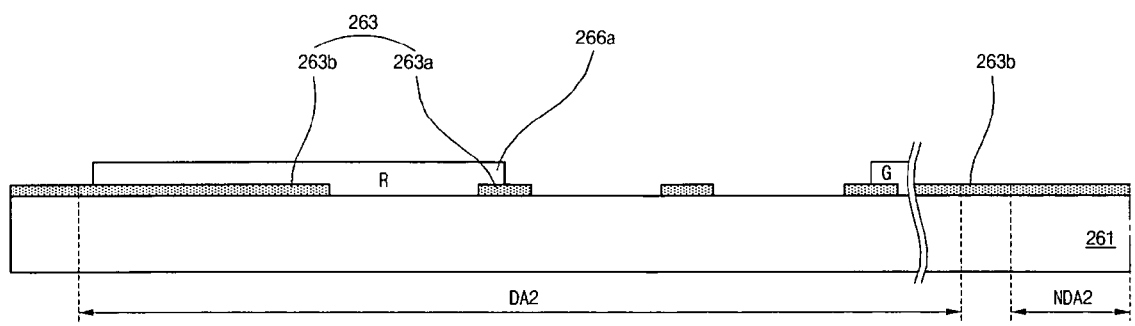

In FIG. 7B, a red sub-color filter 266*a* is formed by coating a red resist material on the second substrate 261 having the black matrix 263.

The red sub-color filter 266*a* is substantially disposed in the pixel region and both end portions of the red sub-color filter 266*a* are overlapped with both end portions of the black matrix 263.

Figure 7C:
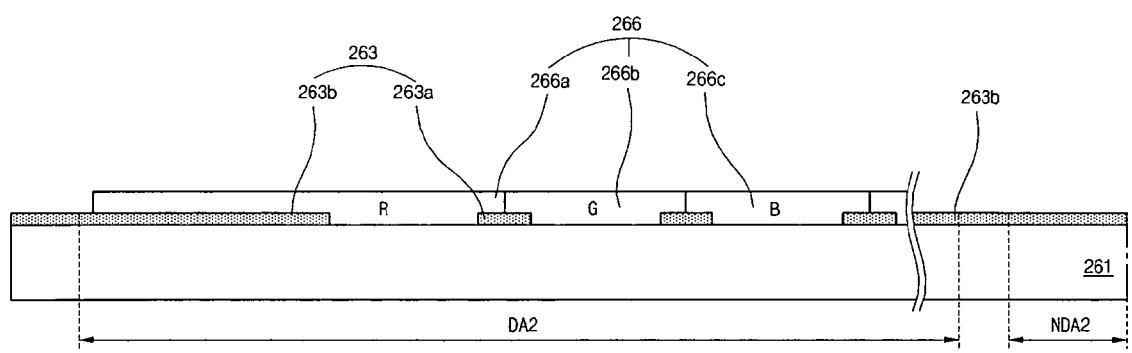

In FIG. 7C, green and blue sub-color filters 266*b* and 266*c* are sequentially formed by coating green and blue resist materials on the substrate having the red sub-color filter 266*a*. The green and blue sub-color filters 266*b* and 266*c* are disposed in the pixel regions on the second substrate 261 having the red sub-color filter 266*a*.

Through this step, the red, green and blue sub-color filters 266*a*, 266*b* and 266*c* constitute a color filter layer 266 in the second display area "DA2." Accordingly, a portion of the black matrix 263b is substantially exposed in the second non-display area "NDA2."

Figure 7D:
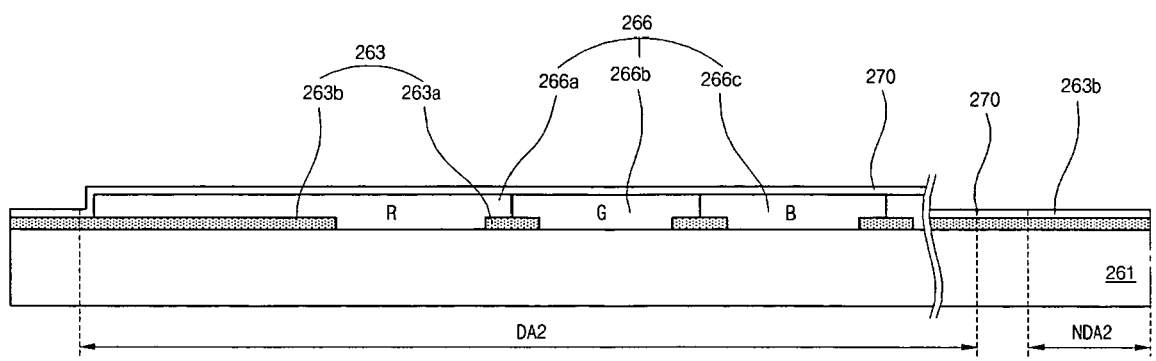

In FIG. 7D, a common electrode 270 is formed on the second substrate 261 including the color filter layer 266 in the second display area "DA2" and the second non-display area "NDA2." The common electrode 270 may include indium tin oxide (ITO) and/or indium zinc oxide (IZO).

Although not shown, when the black matrix 263 is made of black resin, an overcoat layer of an organic insulating material may be formed on the common electrode 270 in the second display area "DA2."

Figure 7E:
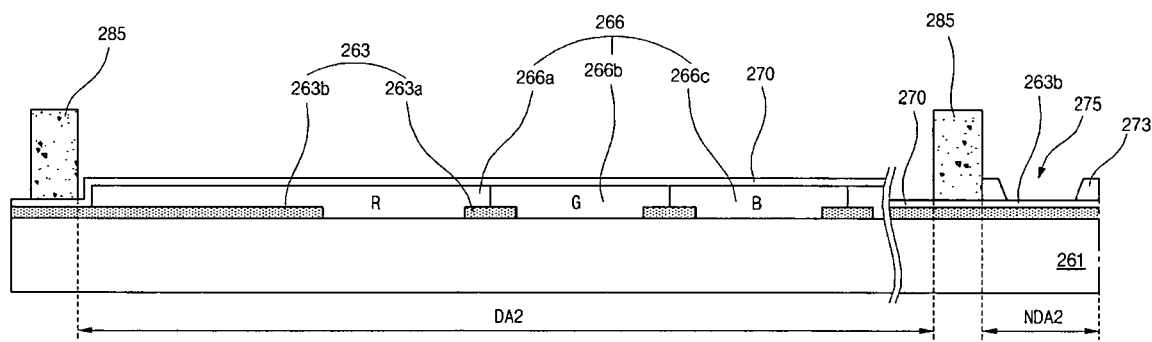

In FIG. 7E, an overcoat layer 273 is formed on the second substrate 261 including the common electrode 270 in the second non-display area "NDA2." Next, the overcoat layer 273 is etched to form a contact hole 275 that exposes a portion of the common electrode 270.

For example, the overcoat layer 273 is formed by coating, such as spin coating, bar coating or slit coating an organic insulating material.

Alternatively, the overcoat layer 273 may be formed by ink-jet printing an organic insulating material without an additional mask process in the second non-display area "NDA2."

Forming the overcoat layer 273 may occur after forming a seal pattern 285 at a region surrounding the second display area "DA2." However, the seal pattern 285 may be formed to surround a first display area (not shown).

Although not shown, a method of fabricating an LCD device includes forming an array substrate which includes forming a thin film transistor over a first substrate including a first display area having a first side, a second side substantially adjacent to the first side and third and fourth sides, and a first non-display area at the first and second sides of the first display area, forming a pixel electrode connected to the thin film transistor, forming a common electrode over a second substrate including a second display area having the first to the fourth sides, and the second non-display area at one of the third and the fourth sides of the second display area the common electrode disposed in the second display area and the second non-display area forming a seal pattern at a region surrounding one of the first display area and the second display area attaching the first substrate and the second substrate so as to face the pixel electrode and the common electrode and so that the second display area substantially corresponds to the first display area, and interposing a liquid crystal layer between the first substrate and the second substrate.

Further, the method of fabricating the LCD device may include forming a common line in the first non-display area and a silver (Ag) dot connecting the common line and the common electrode in at least one of edges of the first and second display area and of the first and second non-display area.

Here, a distance "d" between the second display area and the second non-display area substantially includes a range within about 0.5 mm to about 2.0 mm.

The LCD device according to the present invention features that the second substrate further includes a second non-display area at the side of the second display area. The second non-display area is offset from the first non-display area after attaching the first and the second substrates.

It is noted that the common electrode is formed in the second non-display area as well as in the second display area. Accordingly, the common voltage applied to the common electrode may be easily measured through the Ag dot.

Further, since a portion of the common electrode is extended to the second non-display area, Ag dot defects and common electrode resistance can be easily performed thus resulting in improved image quality.

It will be apparent to those skilled in the art that various modifications and variations can be made in the liquid crystal display device and method of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a first substrate including a first display area having a first side, a second side adjacent to the first side and third and fourth sides, and a first non-display area at the first and second sides of the first display area;
a second substrate facing the first substrate and including a second display area corresponding to the first display area and having the first to the fourth sides, and a second non-display area at one of the third and the fourth sides of the second display area, wherein at least a portion of the second non-display area is not overlapped with the first substrate;
a thin film transistor over an inner surface of the first substrate;
a pixel electrode connected to the thin film transistor;
a common line in the first non-display area;
a common electrode over an inner surface of the second substrate and a silver (Ag) dot connecting the common line and the common electrode, wherein a common voltage is applied to the common electrode through the silver (Ag) dot, wherein the common electrode is substantially disposed in the second display area and at least the portion of the second non-display area that is not overlapped with the first substrate, and wherein the portion of the second non-display area is provided for applying a voltmeter for measuring the common voltage applied to the common electrode through the common line and the silver (Ag) dot, whereby the common voltage of the common electrode in the second non-display area can be measured to confirm whether the silver (Ag) dot is defective; and
a liquid crystal layer between the pixel electrode and the common electrode.

2. The device according to claim 1, further comprising a gate line on the inner surface of the first substrate and a data line crossing the gate line to define a pixel region.

3. The device according to claim 1, further comprising a color filter layer between the second substrate and the common electrode, the color filter layer includes red, green and blue sub-color filters.

4. The device according to claim 3, further comprising a black matrix having a first black matrix pattern between the second substrate and the color filter layer and disposed at boundary between the red, green and blue sub-color filters, and a second black matrix pattern substantially adjacent to the first black matrix pattern and disposed in the second non-display area.

5. The device according to claim 1, further comprising an overcoat layer on the common electrode in the second non-display area, the overcoat layer having a contact hole that exposes a portion of the common electrode.

6. The device according to claim 1, wherein the silver (Ag) dot connecting the common line and the common electrode is in at least one of edges of the first and second display areas and of the first and second non-display area.

7. The device according to claim 1, further comprising a seal pattern between the pixel electrode and the common electrode.

8. The device according to claim 7, wherein the seal pattern is disposed at a region surrounding the first display area and the second display area.

9. The device according to claim 1, wherein a distance between the second display area and the second non-display area substantially includes a range within about 0.5 mm to about 2.0 mm.

10. The device according to claim 1, wherein the voltmeter includes a probe and wherein the probe contacts the common electrode disposed in the portion of the second non-display area that is not overlapped with the first substrate.

11. A method of fabricating a liquid crystal display device, comprising:

forming a thin film transistor over a first substrate including a first display area having a first side, a second side adjacent to the first side and third and fourth sides, and a first non-display area at the first and second sides of the first display area;

forming a pixel electrode connected to the thin film transistor;

forming a common line in the first non-display area;

forming a common electrode over a second substrate and a silver (Ag) dot connecting the common line and the common electrode, wherein a common voltage is applied to the common electrode through the silver (Ag) dot, wherein the second substrate includes a second display area having the first to the fourth sides, and a second non-display area at one of the third and the fourth sides of the second display area, and wherein the common electrode is substantially disposed in the second display area and at least a portion of the second non-display area that is not overlapped with the first substrate;

forming a seal pattern at a region surrounding one of the first display area and the second display area;

attaching the first substrate and the second substrate so as to face the pixel electrode and the common electrode and so that the second display area corresponds to the first display area;

interposing a liquid crystal layer between the first substrate and the second substrate; and confirming whether the silver (Ag) dot is defective by measuring the common voltage of the common electrode in the second non-display area, wherein the portion of the second non-display are is provided for applying a voltmeter for measuring the common voltage applied to the common electrode through the common line and the silver (Ag) dot.

12. The method according to claim 11, further comprising forming a gate line on the inner surface of the first substrate and a data line crossing the gate line to define a pixel region.

13. The method according to claim 11, further comprising forming a color filter layer between the second substrate and the common electrode, the color filter layer includes red, green and blue sub-color filters.

14. The method according to claim 13, further comprising forming a black matrix having a first black matrix pattern between the second substrate and the color filter layer and disposed at boundary between the red, green and blue sub-color filters, and a second black matrix pattern substantially adjacent to the first black matrix pattern and disposed in the second non-display area.

15. The method according to claim 11, further comprising forming an overcoat layer on the common electrode in the second non-display area, the overcoat layer having a contact hole that exposes a portion of the common electrode.

16. The method according to claim 11, wherein the silver (Ag) dot connecting the common line and the common electrode is in at least one of edges of the first and second display areas and of the first and second non-display areas before interposing the liquid crystal layer.

17. The method according to claim 11, wherein a distance between the second display area and the second non-display area substantially includes a range within about 0.5 mm to about 2.0 mm.

* * * * *